INVENTOR
ARTHUR M. AMOS

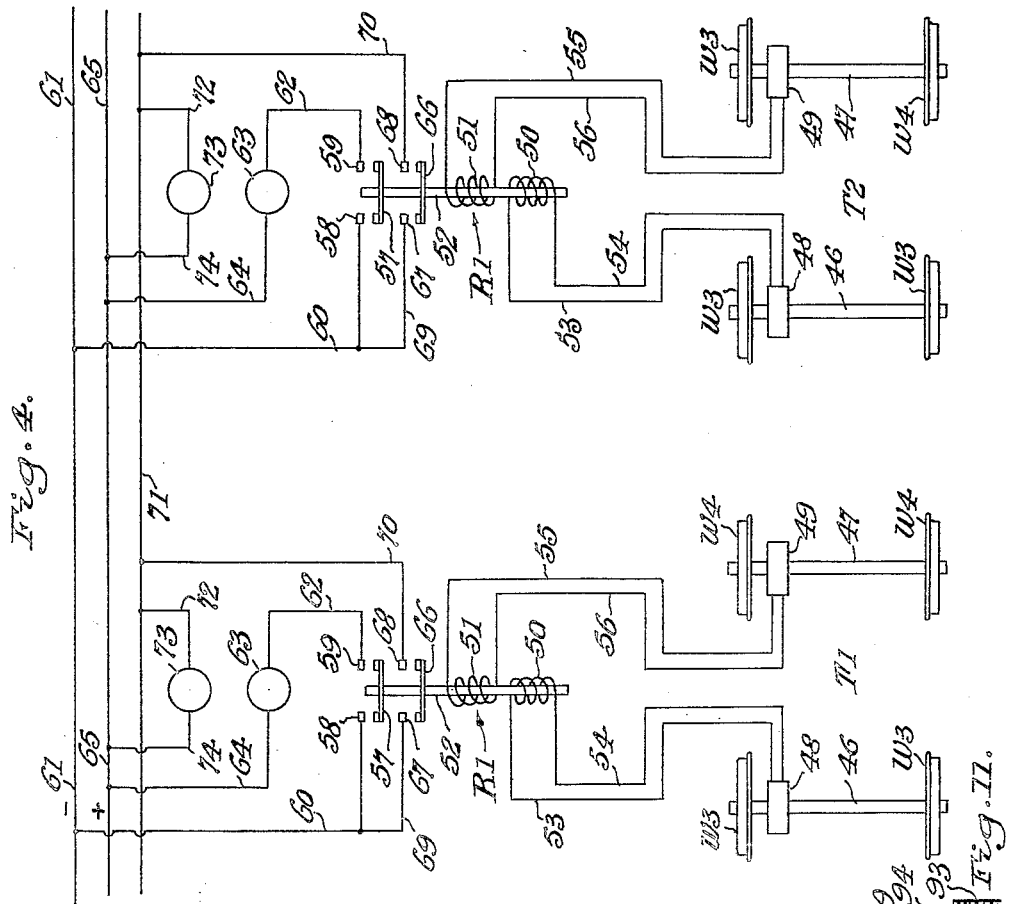
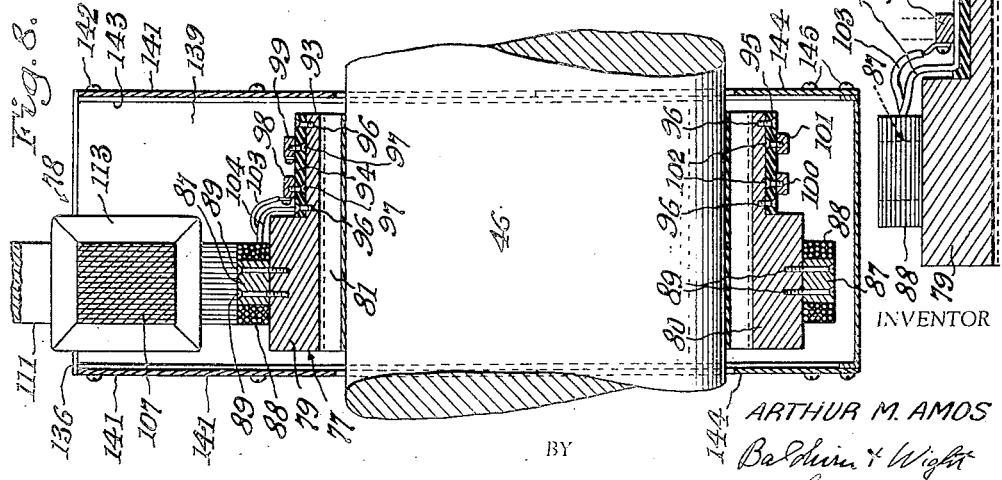

Dec. 3, 1957   A. M. AMOS   2,815,503
WHEEL SLIP OR LOCK INDICATOR
Filed Sept. 16, 1952   4 Sheets-Sheet 3
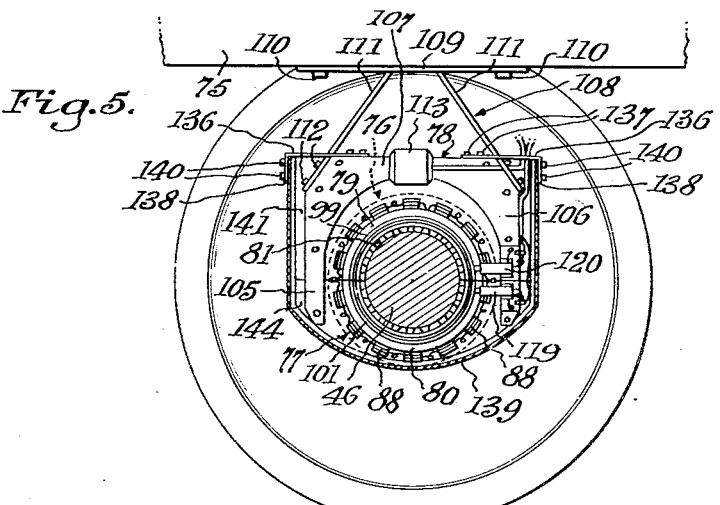
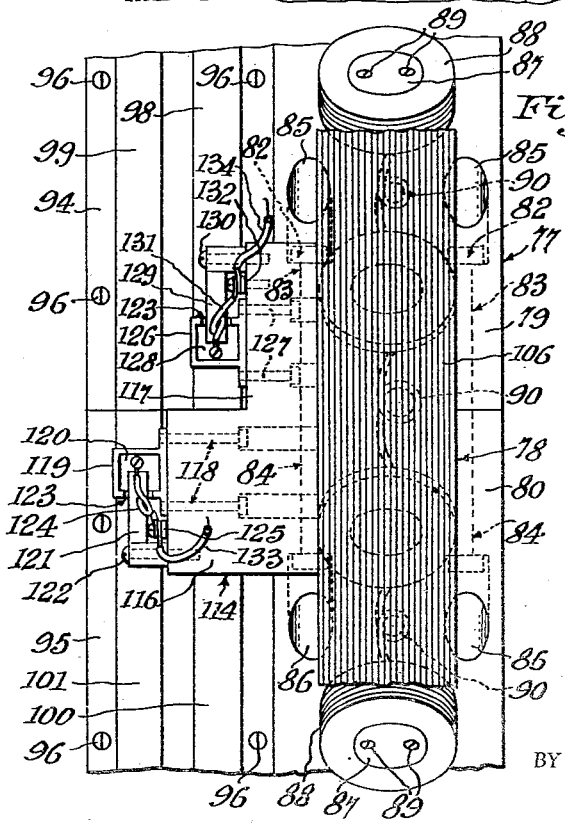
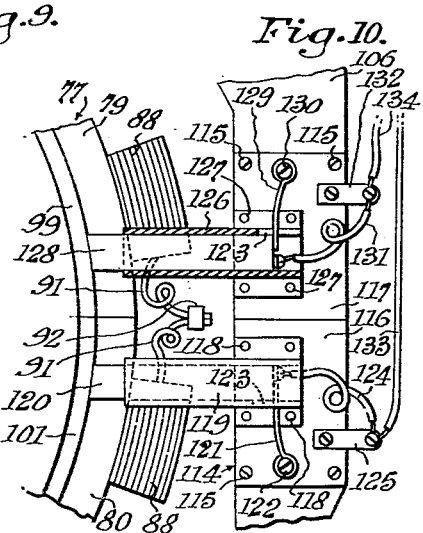
INVENTOR
ARTHUR M. AMOS
BY Baldwin & Wight
ATTORNEYS

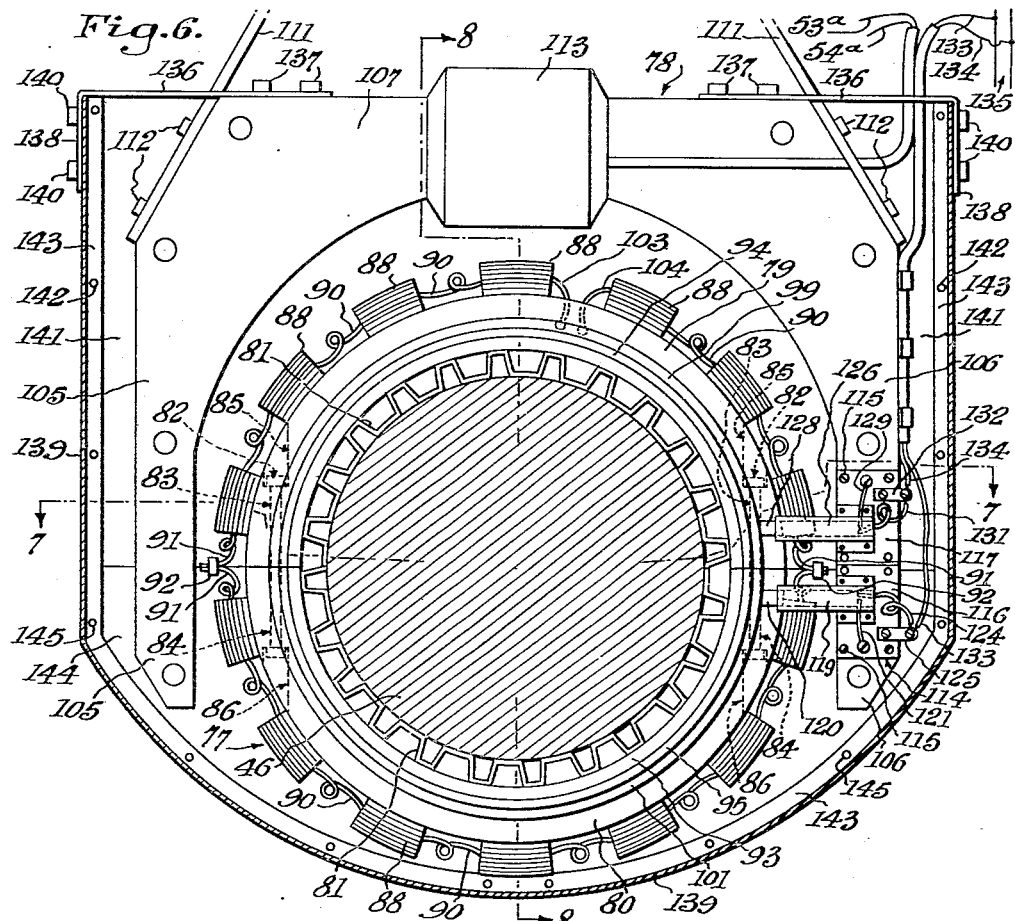

United States Patent Office 2,815,503
Patented Dec. 3, 1957

2,815,503

WHEEL SLIP OR LOCK INDICATOR

Arthur M. Amos, Richmond, Va.

Application September 16, 1952, Serial No. 309,858

5 Claims. (Cl. 340—268)

This invention relates to wheel slip or lock indicators. In a broad sense, a system or mechanism embodying the invention is capable of responding to a departure from a normal or predetermined relation of the speeds of rotation of two or more operatively related ground or track engaging wheels of a vehicle or vehicle train. More particularly, the invention may be embodied in electrically driven locomotives having separate motor drives for different wheels, e. g., so-called diesel electric locomotives, for responding to wheel slipping, wheel locking, or unequal braking; and may also be embodied in railway cars for responding to unequal braking, or wheel locking.

It previously has been proposed to provide systems or mechanisms of the general class referred to adapted to respond to the slipping or unequal braking of electric locomotive wheels, and these systems or mechanisms are understood to have depended upon the delivery of power from the locomotive generator to the driving motors.

An object of the present invention is to provide an improved system or mechanism of the kind referred to characterized in that it includes electrical machines, either motors or generators, associated respectively with a plurality of vehicle wheels and related circuits and apparatus so as to be capable of responding to a departure from a predetermined relation of the rotative speed of the wheels either during or in the absence of delivery of power to the electrical machines.

Another object of the invention is to provide a system or mechanism of the kind referred to adapted to be operatively mounted and associated with existing railway rolling stock with a minimum of changing of the rolling stock itself.

Another object of the invention is to provide a system or mechanism of the class stated adapted to be conditioned, by the selective setting of switch means, to respond to departures from a normal relation of the wheel speeds of an electric locomotive irrespective of whether the wheel driving motors are connected with the power source in series or in parallel, or are disconnected from the power source.

A further object of the invention is to provide equipment of the kind described including a generator, magneto, or like electrical machine so constructed that it may be mounted for cooperation with a wheel axle, inboard of the wheels and bearings, without disassembling the wheel, axle, and bearing unit.

Other objects of the invention will become apparent from a reading of the following description, the appended claims, and the accompanying drawings, in which:

Figure 1 is a wiring diagram showing signalling equipment embodying the invention operatively associated with the generator and driving motors of a vehicle such as a diesel electric locomotive, the circuit for supplying power from the generator to the motors being conditioned for no power delivery, and the signalling circuit means being shown conditioned for responding to any departure from predetermined relative rotative speeds of the motors;

Figure 4 is a schematic view of a wiring diagram showing the invention as being embodied in connecton wth the axles and wheels of a car or cars;

Figure 5 is a fragmentary view, partly in vertical section and partly in elevation, showing a constructional form of generator applied to a car truck;

Figure 6 is a view partly in vertical section and partly in elevation showing the generator illustrated in Figure 5 on an enlarged scale;

Figure 7 is a horizontal section on the line 7—7 of Figure 6;

Figure 8 is a vertical section on the line 8—8 of Figure 6;

Figure 9 is a fragmentary elevational view from the right of Figure 6 and with a cover removed;

Figure 10 is a fragmentary, elevational view of brush holder equipment shown in Figure 9, as viewed when looking from the left of Figure 9, a brush holder being shown in section;

Figure 11 is an enlarged detailed section of a rotor sector equipped with a pole piece and slip ring sections mounted on an insulating member carried by the stator section; and Figure 12 is a perspective view of a part of a cushion strip for mounting a generator stator on an axle.

Figure 1:
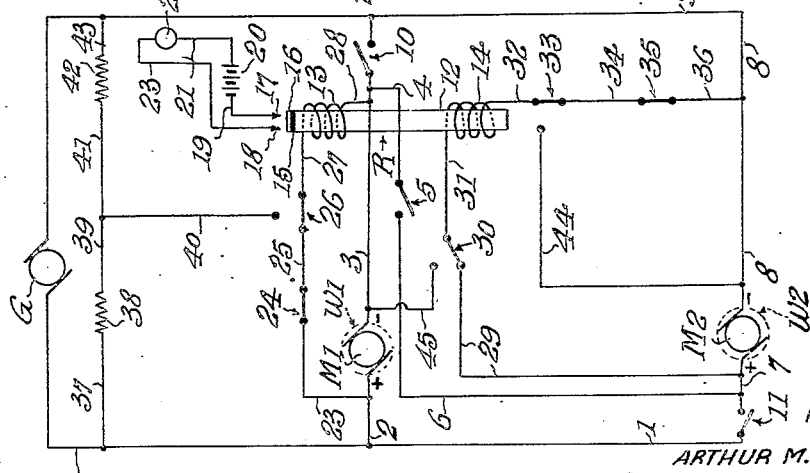
Figure 2:
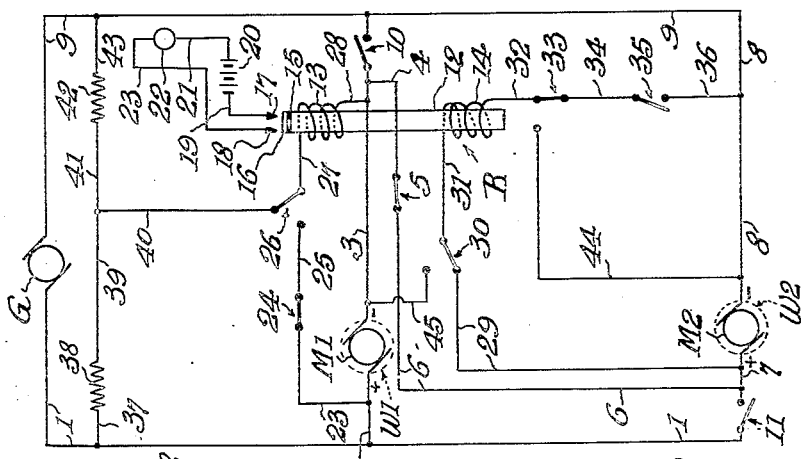
Figure 2 is a view similar to Figure 1 but showing the parts conditioned for operation when the motors are connected in series with the generator for receiving power therefrom.
Figure 3:
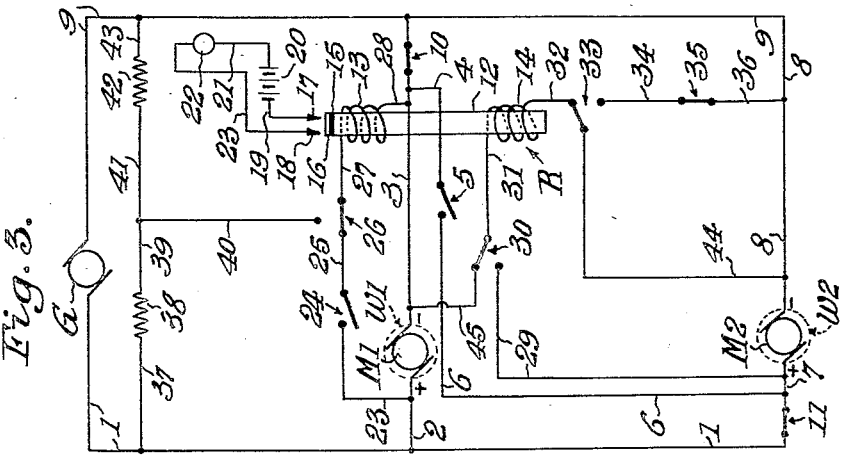
Figure 3 is a view similar to Figure 2 but showing the parts conditioned for operation when the motors are connected in parallel with the generator for receiving power therefrom.

Figures 1 to 3 show diagrammatically a preferred embodiment of the invention in connection with generator-motor electrical equipment for driving a locomotive, for example, of the so-called diesel electric type. The apparatus includes a generator G which may be driven by a diesel engine, not shown, and motors M1 and M2 adapted respectively to drive wheels W1 and W2. As is customary, circuit controlling means are provided for enabling the motors M1 and M2 to be connected in series with the generator G or in parallel with the generator, or to be disconnected from the generator so as to receive no electrical power. The main electrical power circuit is shown in Figure 2 as being conditioned for connecting the motors M1 and M2 in series with the generator G. Beginning at the left side of the generator, a conductor 1 leads through a conductor 2 to the left side of the motor M1, and a conductor 3 leads from the right side of the motor M1 to a conductor 4, thence through a closed single pole, single throw switch 5, and conductors 6 and 7 to the left side of the motor M2. The right side of the motor M2 is connected through conductors 8 and 9 to the right side of the generator G, so that both motors are connected in series with the generator.

Figure 3 shows the main power circuit conditioned for connecting the motors M1 and M2 in parallel with the generator G. The motor M1 is connected across the generator G by conductors 1 and 2 leading from the left side of the generator to the left side of the motor, and the right side of the motor is connected to the right side of the generator by the conductor 3, a closed single pole, single throw switch 10 in the conductor 3, and the conductor 9. In the parallel connection circuit, the motor M2 is connected across the generator by the conductor 1, a closed single pole, single throw switch 11, the conductor 7, and the conductors 8 and 9.

When no power is to be delivered from the generator G to either of the motors M1 or M2, the circuit is conditioned as shown in Figure 1. In this case, the switches 5 and 10 are both open, so that the motor M1 is disconnected from the line 9, and, hence, from the right side of the generator G. Also, since the switches 5 and 11 are both open, the motor M2 is disconnected from the left side of the generator. Hence, the power circuits for both motors M1 and M2 are open, and no power is delivered by the generator G. This may be the condition of the power circuit means when the locomotive is standing, and, also, when it is coasting without application of power from the generator.

In normal operation, the wheels W1 and W2 and, consequently, the motors M1 and M2 turn at predetermined relative speeds, which in most instances are equal speeds. If, abnormally, one of the wheels W1—W2 slips when the motors are receiving power from the generator, the two wheels no longer will rotate at the predetermined normal relative speeds. So, too, if one of the wheels W1—W2 is locked or abnormally decelerated because of improper braking or a bearing failure, the wheels no longer will rotate at the predetermined normal relative speeds. In accordance with the present invention, indicating apparatus is provided for operating a signal or control means associated with the motors M1 and M2 and parts of the power circuit when there is any departure from the normal relative rotation of the wheels W1—W2. A particular advantage of the indicating apparatus disclosed in Figures 1, 2, and 3 is that it is operable for either of the circuit conditions described with reference to these respective figures, that is, the indicating mechanism is operable whether the motors are disconnected from the generator, are connected with the generator in series, or are connected in parallel across the generator.

The indicating mechanism includes a relay generally designated R which is shown as being of the solenoid type including an armature 12 in the form of a single bar of magnetic material extending through winding means comprising two separate coils 13 and 14 which are wound in opposite directions. The coils 13 and 14 are shown in spaced relationship for clearness of schematic illustration, but in practice they are closely associated or positioned with respect to each other.

The arrangement of the coils and armature 12 is such that, when either coil alone is energized, the armature 12 is raised from the position shown in Figure 1 to close an indicating circuit. An insulating member 15 on the top of the armature carries a contact bridge 16 which normally is disposed below contacts 17 and 18 but engages them when the armature is raised. The contact 17 is connected to a conductor 19 which leads through a battery 20 to a conductor 21 leading to a signal device such as a lamp 22 which is connected through a conductor 23 to the contact 18. When the armature 12 is raised by the energization of either one of the coils 13 and 14, the lamp 22 and battery 20 circuit is closed by the contact parts 16, 17, and 18, so that a signal is provided. The signal 22, although described as comprising a lamp, may, if desired, comprise a horn or other advisory signal element; or, alternatively, the device 22 may be connected to mechanism, not shown, for operating a control device.

Because of the reverse winding of the coils 13 and 14 and their relative positioning, if equal voltages are impressed upon the coils with like potential signs, i. e., plus or minus, at corresponding ends of the coils, the magnetic effects of the coils will neutralize each other, so that the armature 12 will not be raised. If the voltage impressed upon one of the coils is substantially less than that impressed upon the other of the coils, the magnetic effects will become unbalanced, so that the magnetic effect produced by one of the coils will be effective to raise the armature and close the signal circuit at the contacts 16, 17, and 18.

The controlling or signalling circuit is operative when the circuit means are conditioned as shown in Figure 1 for disconnecting the motors M1 and M2 from the generator G in the manner previously described. In this condition of the circuits, the operation of the signalling system depends upon the counter electromotive forces generated by the motors M1 and M2 while the wheels W1 and W2 are turning, as, for example, when a locomotive is coasting, and the production of the counter electromotive force is possible because of the residual magnetism in the fields of the motors M1 and M2, but apparatus embodying the invention may also be used when the fields are separately excited in any desired or known manner. In Figure 1, the left sides of the motors M1 and M2, i. e., those sides connected to the conductor 1, may be considered as being of positive potential counter electromotive force, and the right sides as being of negative potential counter electromotive force.

When the circuit is conditioned as shown in Figure 1, the coil 13 is connected across the motor M1, and the coil 14 is connected across the motor M2. The circuit for the coil 13 includes the conductor 2 leading from the positive side of the motor M1 through a conductor 23, a closed single pole, single throw switch 24, a conductor 25, a closed single pole, double throw switch 26, a conductor 27 leading to the top of the coil 13, the coil 13 itself, a conductor 28, and the conductor 3 leading to the negative side of the motor M1.

In the Figure 1 condition, the circuit for energizing the coil 14 includes the conductor 7 leading from the positive side of the motor M2, a conductor 29, a closed single pole, double throw switch 30, a conductor 31 leading to the top of the coil 14, the coil 14 itself, a conductor 32, a closed single pole, double throw switch 33, a conductor 34, a closed single pole, single throw switch 35, a conductor 36, and the conductor 8 connected to the negative side of the motor M2.

With the signalling or controlling circuits conditioned as shown in Figure 1, no power being delivered to the motors by the generator, the coils 13 and 14 are respectively connected across the motors M1 and M2, with the upper ends of both coils being at positive potential, and the lower ends of both at negative potential. Consequently, if the motors M1 and M2 are operating at predetermined or equal speeds and the counter electromotive forces produced by the motors are substantially equal, the magnetic effects produced by the coils 13 and 14 will neutralize each other, and the relay armature 12 will not be operated. If one of the motors slows down or stops completely, the magnetic effect of the relay coil associated with the other motor will become unbalanced so as to raise the armature 12 and close the contacts 16, 17, and 18 operating the signal 22 as previously described.

The conditioning of the signalling or controlling circuits to cooperate with the generator, the motors, and the power circuits when the latter are conditioned to connect the motors in series with the generator is shown in Figure 2. In this condition of the circuits, the relay coil 14 is isolated or disconnected by the open switch 35. The coil 13 is connected across both motors M1 and M2 in such a way that the motor M1 applies positive potential to the upper end of the coil, and negative potential to the lower end, whereas the motor M2 applies negative potential to the upper end of the coil and positive potential to its lower end. The circuit for connecting the motor M1 to the coil 13 includes the conductor 2 leading from the positive side of the motor M1 through the conductor 1, a conductor 37, a resistance 38, a conductor 39, a conductor 40, a single pole, double throw switch 26, the conductor 27 connected to the top of the coil 13, the coil 13 itself, the conductor 28 leading from the lower end of the coil 13, and the conductor 3 leading to the negative side of the motor M1.

The circuit for connecting the coil 13 across the motor M2, as shown in Figure 2, includes the conductor 7 leading from the positive side of the motor M2, the conductor 6, the switch 5, the conductor 4, the conductors 3 and 28 connected to the lower end of the coil 13, the coil 13 itself, the conductor 27 leading from the upper end of the coil 13, the switch 26, the conductor 40, a conductor 41, a resistance 42, a conductor 43, and the conductors 9 and 8 leading to the negative side of the motor M2. Thus, the electromotive forces imposed on the coil 13 by the motors M1 and M2 are of opposed polarity, so that, as long as the motors M1 and M2 are operating at equal speeds, the electromotive forces applied to the coil 13 neutralize each other, and the armature 12 will not be lifted. If there is a departure from the predetermined normal relative rotative speeds of the motors because of an abnormal operating condition, such as the slipping or spinning of the wheels associated with one of the motors, or retarding or stopping of one of the motors through improper braking or bearing failure, the voltage impressed on the coil 13 by one of the motors will be unbalanced. Consequently, the armature 12 will be raised to close the contacts 16, 17, and 18 and operate the signal 22.

When the power circuits are conditioned for connecting the motors M1 and M2 in parallel with the generator, the signalling control circuits are conditioned as shown in Figure 3. Here, the coil 13 is isolated or disconnected by the open switch 24 and by the disconnection of the switch 26 from the conductor 40. The coil 14 is connected across both motors M1 and M2 in such a way that the two motors apply their counter electromotive forces with opposite potentials, respectively, at opposite ends of the coil 14. The circuit for connecting the motor M1 to the coil 14 includes the conductor 2 leading from the positive side of the motor, the conductor 1, the closed switch 11, the conductor 7, the motor M2, the conductor 8, a conductor 44, the switch 33, the conductor 32 connected to the lower end of the coil 14, the coil 14 itself, the conductor 31, the switch 30, a conductor 45, and the conductor 3 leading to the right side of the motor M1.

The circuit for connecting the coil 14 across the motor M2 when the power circuit is conditioned for operation of the motors in parallel with the generator includes the conductor 7 leading from the positive side of the motor M2, the switch 11, the conductors 1 and 2, the motor M1, the conductors 3 and 45, the switch 30, the conductor 31 connected to the top of the coil 14, the coil 14 itself, the conductor 32, the switch 33, and the conductors 44 and 8 leading to the negative side of the motor M2. Thus, the motor M1 impresses negative potential at the top of the coil 14 and positive potential at the bottom thereof, whereas the motor M2 impresses positive potential at the top of the coil and negative potential at the bottom thereof. As long as equal potentials are impressed on the coil 14 by the two motors, there will be no unbalanced magnetic force, and the armature 12 will remain in normal position. If, because of any abnormal operating condition, there is a departure from the predetermined relative rotative speeds of the motors M1 and M2, the coil 14 will become unbalanced, so that the armature 12 will be raised to close the signalling circuit contacts 15, 16, and 17 to operate the signal 22.

Thus, the power and control or signalling circuits described with reference to Figures 1, 2, and 3 are so interrelated that the signal 22 will be operated to indicate a departure from the predetermined relative rotative speeds of the motors and their connected wheels, irrespective of whether the generator is delivering power to the motors connected in series or connected in parallel, or whether the circuits are under no power conditions, i. e., when no power is being delivered by the generator.

The motors M1 and M2 may be equipped with reversing mechanism of any suitable or conventional kind, which need not be illustrated. It is apparent that, since motors of Diesel electric locomotives or similar equipment customarily are reversed simultaneously, and since the relative potentials would remain the same after reversal, the changes in potential on the coils 13 and 14 would not interfere with operation of the relay.

Figure 4 illustrates schematically an embodiment of the invention for signalling or indicating unequal braking or locking of wheels of a vehicle or vehicles such as articulated units of a vehicle train. Figure 4 shows schematically two wheel trucks T1 and T2 which may be considered as being on different cars or units of a train.

The truck T1 includes an axle 46 mounted on which are wheels W3—W3, and an axle 47 mounted on which are wheels W4—W4. Mounted on the axles 46 and 47, respectively, are generators 48 and 49 which may be of any suitable type, such as the self-exciting or magneto type, or of a kind requiring field excitation from an outside source. Normally, when the wheels W3 and W4 and consequently the rotors of the generators 48 and 49 are turning at predetermined relative speeds—in most installations, at equal speeds—the outputs of the generators will be equal. Apparatus is provided for detecting any inequality of the outputs in the generators reflecting departure from the normal relative speeds of the wheels W3 and W4, and for operating a signal.

The detecting and signal operating mechanism associated with the truck T1 comprises a relay generally designated R1, including two oppositely wound coils 50 and 51 and an armature 52 operatively associated with both coils 50 and 51. The coils are shown spaced from each other in the schematic illustration of Figure 4, but in practice are so positioned relatively to each other that, when equal electromotive forces are applied to the two oppositely wound coils, they will neutralize each other so as to produce no effective magnetic force capable of moving the armature 52. When the electromotive force impressed upon one of the coils exceeds that impressed upon the other, or when electromotive force is impressed on only one of the coils, an effective magnetization will be produced for raising the armature 52.

The coil 50 is connected across the generator 48 by conductors 53 and 54, whereas the coil 51 is connected across the generator 49 by conductors 55 and 56.

Raising of the armature 52 in response to a departure from the predetermined normal relative speeds of the wheels W3 and W4 and their associated generators 48 and 49 is utilized to close a signalling circuit. For this purpose, the armature 52 is equipped with an upper contact bar 57 adapted to bridge fixed contacts 58 and 59. The contact 58 leads through a conductor 60 to a source of negative potential 61. The contact 59 is connected by a conductor 62 to a signal device 63 which may be a white light, the device 63 being connected by a conductor 64 to a source of positive potential 65. When the armature 52 is lifted in response to stopping of one of the wheels or slowing down of one of the wheels with respect to the other of the wheels, the white lamp 63 signalling circuit will be closed by the contacts 57, 58, and 59 so as to give an indication of the abnormal functioning of the wheels. The lamp 63 may be mounted on the control panel of the car associated with the truck T1, so that lighting of the lamp 63 will advise a crew member as to where the difficulty exists.

Each truck on the train may be equipped with generators and associated equipment similar to that described with respect to the truck T1. Thus, in Figure 4, the truck T2 which may be considered as being on a car other than that with which the truck T1 is associated is provided with generators 48 and 49 and with associated circuit and signalling equipment the same as that described above. It is desirable to provide a master signal operable by any of a plurality of wheels on any of the train units for indicating the abnormal condition at a central control or observation point, for example, at the engineer's station. For this purpose, the armature 52 included in the equipment associated with each truck is provided with a lower contact bar 66 adapted to bridge fixed contacts 67 and 68. The contact 67 leads through a conductor 69 to the conductor 60, and the contact 68 leads through a conductor 70 connected to a master line conductor 71 to which are connected other conductors 70 associated with each of the other trucks in the train. A conductor 72 leads through an additional signal, for example, a red lamp 73, which is connected to a conductor 74 leading to the source of positive potential 65. Thus, when any relay armature 52 is raised, a circuit will be established from the source of negative potential 61 through the conductors 60 and 69, the contacts 66, 67, and 68, the conductors 70, 71, and 72, the master signalling lamp 73, the conductor 74, and the source of positive potential 65.

It is desirable that the equipment described with reference to Figure 4, and particularly the generators, be such that the equipment may be applied to existing vehicles with a minimum of expense and without necessitating substantial alteration or disassembling of the existing equipment, and so that the generators may be removed from the standard equipment for servicing without necessitating disassembling the standard equipment. Figures 5 to 12 show a preferred construction of generator and means for mounting it in association with standard railway car axles and cars without necessitating the removal of the axles or other disassembling operations. In the preferred construction shown, the axle 46 on which the wheels W3 are mounted is mounted on a truck frame part 75 by bearings 76 which journal the axle in the usual manner.

The generator 48 comprises a rotor generally designated 77 and a stator generally designated 78. The rotor 77 is constructed in such manner that it may be applied to the axle 46 inboard of the wheels and journals without disturbing the axle mounting. For this purpose, the rotor 77 is constituted by arcuate half sections 79 and 80 adapted to be placed on the axle 46 by movement radially inward toward the axle. Preferably, a circular cushion which may be in the form of an undulating strip 81 of metal is interposed between the arcuate stator sections and the axle so as to enable the assembled stator 77 to be centralized with respect to the axle 46, even though the surface of the axle inboard of the wheels and bearings may be slightly rough.

After the stator sections 79 and 80 and the cushion strip 81 have been placed on the axle 46, the parts may be secured in place by clamping bolts 82 extending through aligned bores 83 and 84 in the sections 79 and 80. The section 79 is recessed at 85 to accommodate the bolt heads, and the section 80 is recessed at 86 to accommodate the clamping nuts which are screwed onto the bolts.

Each of the rotor sections 79 and 80 is equipped with a plurality of pole pieces 87 provided with windings 88. Screws 89 secure the pole pieces to the sections 79 and 80 before the sections are assembled on the axle. The pole windings 88 on each rotor section are connected by wires 90, and free end wires 91 at the ends of each rotor section are adapted to be connected to similar wires 91 at the ends of the other section by connecting devices 92.

The rotor sections have reduced-diameter end parts 93 to which arcuate insulating ring sections 94 and 95 are secured by screws 96. Secured to the insulating ring section 94 by screws 97 are arcuate slip ring sections 98 and 99. Other arcuate slip ring sections 100 and 101 are secured to the insulating section 95 by screws 102. In the assembled construction, the mating ends of the slip ring sections 98 and 100 may be joined electrically in any suitable manner, as may be the mating ends of the slip ring sections 99 and 101.

The winding 88 of the pole piece 87 at the top of the rotor 77, as viewed in Figure 6, is not connected to the winding 88 of the pole piece immediately to the right. Instead, a wire 103 leads from the pole piece winding at the top to the slip ring 98, 100; and a wire 104 leads from the pole piece winding immediately to the right to the slip ring 99, 101.

It will be observed that the stator sections, each carrying pole pieces and slip ring sections, may easily be applied to the axle 46 and assembled as a circular unit; and that, after they have been clamped in place, the electrical connections may be made without necessitating any changing or disassembling of the axle bearing or frame equipment.

The stator 78 is so formed that it can be operatively associated with the rotor 77 without changing or disassembling any of the standard car equipment. In the preferred form shown, the stator 78 is of U shape, having legs or pole pieces 105 and 106 and a connecting or bar portion 107, all of laminated construction. A mounting bracket generally designated 108 comprises an attaching plate 109 adapted to be secured to the under side of the truck frame part 75 by means of screws 110. The bracket 108 further includes diverging and downwardly extending legs 111 adapted to be secured to the stator 78 by screws 112. The U-shaped stator, being open at its lower end, enables the stator to be slipped radially inwardly over the axle 46 so as to position the stator pole pieces 105 and 106 on opposite sides of the axle and the rotor 77, after which the stator may be secured to the car frame by means of the bracket 108.

The stator is provided with a field coil 113 having end connections 53ª and 54ª adapted respectively to be connected to the conductors 53 and 54 shown in Figure 4. The generator shown in Figures 5 to 12, inclusive, may be self-excited, for example, it may be of the magneto type, in which case the pole pieces 87 would be permanently magnetized and the slip rings could be omitted. In some instances, however, it may be desirable to excite the rotor from a separate source, in which case the slip rings previously referred to are brush-connected to an exciting circuit. Accordingly, a brush holder block 114 of insulating material is secured to the stator 78 by screws 115. The block 114 is formed with a high part 116 and a low part 117, as best shown in Figures 9 and 10. Secured to the high part 116 by screws 118 is a brush holder 119, in which a brush 120 is mounted for sliding movement and is held against the slip ring 99, 101 by a spring 121 anchored at 122 on the high part 116 of the block 114. The spring 121 extends through a slot 123 in the brush holder 119. The brush 120 is connected by a pigtail conductor 124 to a terminal connector 125. Another brush holder 126 is secured to the low part 117 of the block 114 by screws 127, and serves to mount a brush 128 held against the slip ring 98, 100 by a spring 129 which is anchored at 130 on the block 114 and extends through a slot 123 in the brush holder 119. A pigtail wire 131 connects the brush 128 to a terminal connector 132.

Conductors 133 and 134 lead from the connectors 125 and 132 to an external excitation source diagrammatically indicated at 135. The excitation provided by this source may be made effective under the control of standard equipment which renders the wheel-operated battery-charging generator effective.

The generator 48 illustrated in Figures 5 to 12, inclusive, may be equipped with a casing or dust shield, as shown in Figures 6, 7, and 8. The casing includes top parts 136, 136 secured to the top of the stator 78 by screws 137 and having dependent legs or flanges 138. A U-shaped part 139 is adapted to be moved upwardly under the axle 46, so that its upper end portions are received under or inside the legs or flanges 138 of the top parts 136. Screws 140 secure the U-shaped part 139 to the top parts 136. Upper end plate sections 141 extend downwardly from the top of the stator to a level at about the center of the axle 46, and are secured by screws 142 to flanges 143 on the U-shaped part 139. Lower end plate sections 144, extending from the bottom of the casing upwardly to a level at about the middle of the axle 46, are secured by screws 145 to the flanges 143.

It is apparent that a generator constructed as described with reference to Figures 5 to 12, inclusive, may easily be applied to existing rolling stock, so that a whole train may be equipped in a minimum time without its being necessary to disassemble or alter any of the standard car parts. The apparatus is simple and requires little servicing, but when servicing is needed it may easily be removed or replaced without disturbing the standard car equipment.

The apparatus described embodies the invention in a preferred form, but it is intended that the disclosure be illustrative rather than definitive, the invention being defined in the appended claims.

I claim:

1. In an indicator system, the combination of two independently rotatable traction wheels; an electric traction motor having a magnetic field and a rotor, for each traction wheel, a generator for driving said traction motors; electrical circuit means between said generator and said motors including switch means selectively closeable for connecting said generator in circuit with said motors and openable for disconnecting said generator from said motors; said rotors being drivingly connected to their associated traction wheels, said motors being inherently capable of generating electromotive forces when driven by said traction wheels independently of said generator and when the latter is electrically disconnected from said generator; an indicator; a differential relay having a pair of opposed windings and an armature; electrical connections from said relay to said indicator controlled by said armature; and connections from one motor to one relay winding and from the other motor to the other relay winding whereby electromotive forces generated by said motors upon rotation by said wheels will be conducted to said windings whereby, when said motor rotors are being driven by said traction wheels at substantially the same speed, said relay armature is not actuated and when said rotors are driven at different speeds said armature is activated to cause operation of said indicator independently of the position of said switch.

2. An indicator system as set forth in claim 1 wherein said electrical connections between said motors and said relay, for applying to said relay windings the electromotive forces created by said motors when driven by said wheels, include other switch means for connecting said relay windings to said motors when said first switch means are open.

3. An indicator system as set forth in claim 1 wherein said electrical circuit means between said generator and said motors includes switch means selectively closeable for connecting said motors in series with each other and with said generator; and wherein said motor relay connections, for applying to said relay windings the electromotive forces created by said motors when driven by said wheels, include other switch means for connecting one of said relay windings to opposed polarity sides of said motors when said first switch means are closed and disconnecting the other of said relay windings from said motors.

4. An indicator system as set forth in claim 1 wherein said electrical connections between said generator and said motors includes switch means selectively closeable for connecting said motors in parallel with each other and with said generator and wherein said motor relay connections for applying to said relay windings the electromotive forces created by said motors when driven by said wheels, include other switch means for connecting one of said relay windings to opposed polarity sides of said motors when said first switch means are closed and disconnecting the other of said relay windings from said motors.

5. An indicator system as set forth in claim 1 wherein said electrical circuits between said generator and said traction motors includes switches selectively settable for establishing three different circuit conditions, the first circuit condition being that said motors are disconnected from said generator, and wherein said motor relay connections include switch means selectively settable whereby one of said relay coils is connected across one of said motors and the other of said coils is connected across the other of said motors and the respective ends of said coils similarly positioned with respect to said armature being connected to similar sides of said motors with respect to the polarity of said motors when said first circuit condition is in effect; the second circuit condition being that said motors are connected in series with each other and with said generator and wherein said motor relay switch means is selectively settable to positions wherein one of said coils is disconnected from said circuit means and the other of said coils is connected at its opposite ends respectively to opposed polarity sides of said motors; and the third circuit condition being that said motors are connected in parallel with each other and said generator and wherein said motor relay switch means is selectively settable to positions where said other of said coils is disconnected from said circuit means and said one of said coils is connected at its opposite ends respectively to opposed polarity sides of said motors.

References Cited in the file of this patent

UNITED STATES PATENTS

| | | |
|---|---|---|
| 2,078,376 | Ford | Apr. 27, 1937 |
| 2,232,896 | Wilson | Feb. 25, 1941 |
| 2,270,122 | Toelle | Jan. 13, 1942 |
| 2,436,341 | Weybrew | Feb. 17, 1948 |
| 2,696,604 | Markow, et al. | Dec. 7, 1954 |